United States Patent

[11] 3,610,383

| [72] | Inventor | Frank N. Rosteo<br>2 Knoll Lane, Jericho, N.Y. 11753 |
|---|---|---|
| [21] | Appl. No. | 880,622 |
| [22] | Filed | Nov. 28, 1969 |
| [45] | Patented | Oct. 5, 1971 |

[54] ROTARY FRICTION CONSTRUCTION
9 Claims, 6 Drawing Figs.

[52] U.S. Cl. .................................................. 192/107 M,
188/218 A
[51] Int. Cl. ..................................................F16d 13/60,
F16d 11/00
[50] Field of Search............................................ 192/107,
107 M, 107 C, 107 T, 107 CP; 188/218 A, 250 AT

[56] References Cited
UNITED STATES PATENTS

| 1,655,827 | 1/1928 | Stanley | 192/107 |
| 1,659,061 | 2/1928 | Thompson | 188/250 AT |
| 2,083,989 | 6/1937 | Eisenhardt | 188/250 AT X |
| 2,247,690 | 7/1941 | Nutt | 192/107 |
| 2,408,441 | 10/1946 | Nutt | 192/107 (CP) |
| 2,464,437 | 3/1949 | Dasher | 192/107 (M) X |
| 2,581,637 | 1/1952 | Danly et al. | 192/107 X |
| 2,993,578 | 7/1961 | Nordgren | 192/107 (CP) |
| 3,171,527 | 3/1965 | Ott | 192/107 X |
| 3,435,935 | 4/1969 | Warman | 192/107 |

FOREIGN PATENTS

| 902,093 | 7/1962 | Great Britain | 188/218 (A) |

*Primary Examiner*—Al Lawrence Smith
*Attorney*—Jerome Bauer

ABSTRACT: A rotary friction construction having a rotatable hub on which there is at least a mounting member mounting a friction member in a rivetless, bond-free manner to permit the dissipation of heat generated at the friction member without producing a consequent distortion of the mounting or the friction members.

PATENTED OCT 5 1971 3,610,383
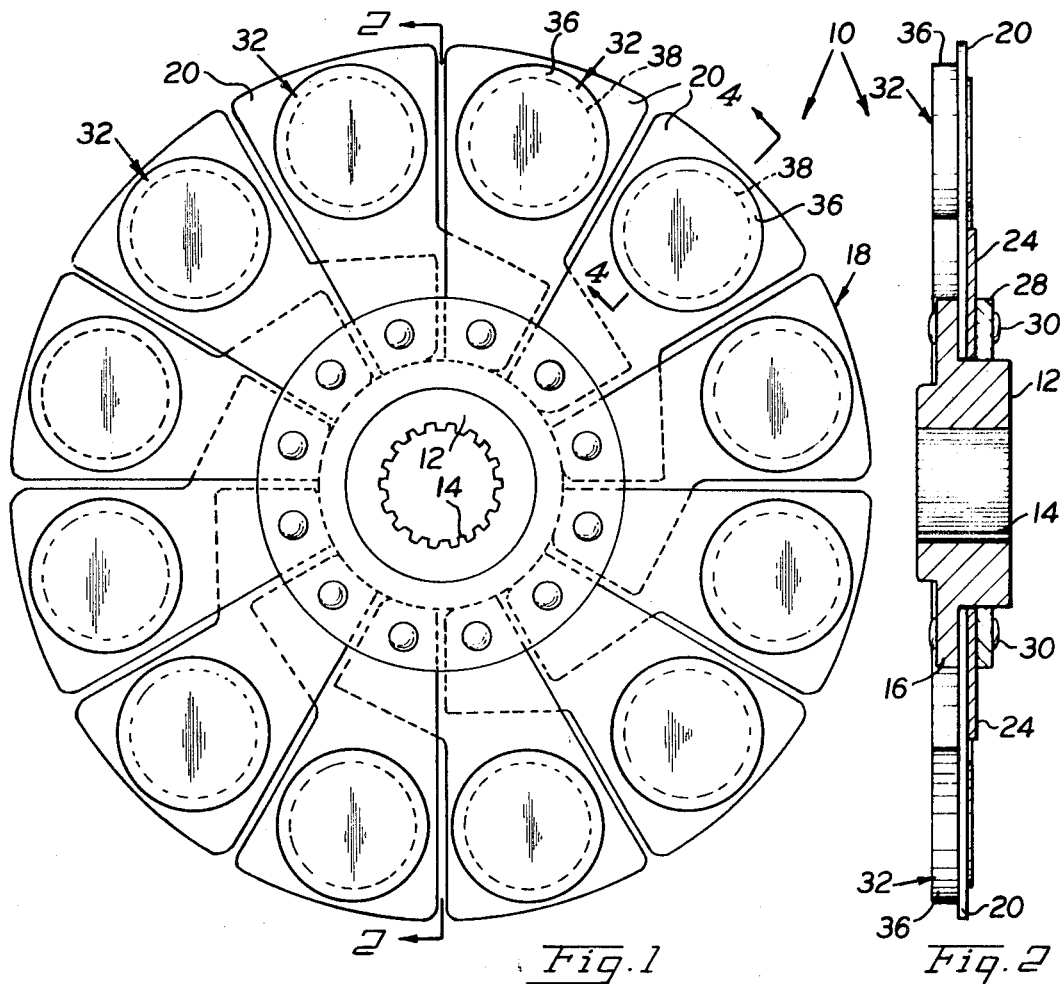
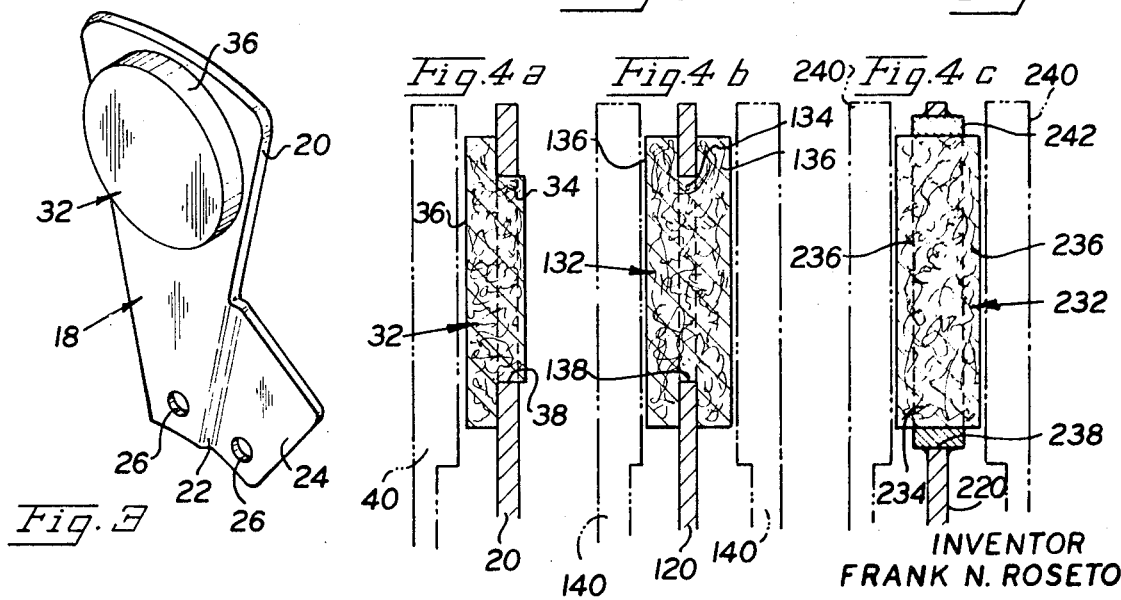
INVENTOR
FRANK N. ROSETO
BY Jerome Bauer
ATTORNEY

ROTARY FRICTION CONSTRUCTION

This invention relates to a rotary friction construction for use in clutches, brakes and the like and is particularly suited to rapidly dissipate kinetic energy in the form of heat generated during the application of clutching or braking forces. One of the problems encountered in clutch and brake constructions is the need to rapidly absorb and/or dissipate the heat that is produced as a result of the clutching or braking forces. In the past, attempts to alleviate the problem have resulted in complicated arrangements of segmented mounting members that provide greater heat dissipating surfaces, and of rivets and bonds that secure the friction members and their surfaces to the mounting members for longer use.

Heat generated at the friction surfaces must be dissipated through the friction members and through the mounting members supporting the same. Because the friction surfaces transmit their heat to their respective mounting members, it is important that the mounting members be able to dissipate the heat without deleterious buckling or distortion which oftentimes results in a breaking of the bond between the friction member and its mounting member or in the tearing of the rivet, bolt or other securing means supporting the friction member to the mounting member.

In those structures utilizing mounting rivets, deleterious coning and wear has resulted. This may be due in part to the fact that the friction members and their mounting members each are made evenly different materials that expand and contract upon the application of different materials that expand and contract upon the application of different heats. Such expansion and contraction, if it occurs, must be permitted in such manner as to enable all the parts secured together to expand and contract equally and evenly. However, by applying limiting attachment means such as rivets, adhesives and other forms of bonds, the mounting members and their mounted friction members cannot expand and contract equally or evenly and, thus, there results a deleterious coning and/or buckling of the related structures.

The desideratum of this invention is to provide a rotary friction construction that utilizes a friction member which dissipates the heat generated at its surfaces to the mounting member without creating a distortion in either the mounting member or the friction member, such construction being unusually well adapted for clutches, brakes and the like.

Another object of the invention is to provide an arrangement for connecting a friction member and a mounting member together in a rivetless, bond-free manner, thereby permitting the dissipation of heat from each such member without producing a consequent distortion in the surfaces of either as has been experienced in the prior art.

Still another object of the invention is to provide a unique method and apparatus for mounting together the friction and mounting members such that the friction member presents substantially the whole of its area for continued use, thereby resulting in a greater and consequently longer, useful and effective life than have friction members of the prior art.

A further object of the invention is to join the friction member with the mounting member to reduce clutch or brake "chatter" by producing a dampening effect between them.

Other objects and features of the invention will become apparent from a consideration of the following description which proceeds with reference to the accompanying drawings in which:

FIG. 1 is a front elevation of a rotary friction structure constructed according to the teaching of the invention;

FIG. 2 is a cross section of FIG. 1 taken along lines 2—2 thereof;

FIG. 3 is a perspective view of one of the mounting members and its related friction member;

FIG. 4a is a cross section of FIG. 1 taken along lines 4—4;

FIG. 4b is a cross section of another embodiment; and

FIG. 4c is a cross section of another embodiment.

Referring now to the drawing and more particularly to FIGS. 1 and 2 thereof, the rotary friction construction there shown is generally identified by the numeral 10. The construction 10 comprises a centrally disposed hub 12 having the interior surface provided with a plurality of axially disposed splines or teeth 14 which are adapted to engage with a drive shaft (not shown) of whatever mechanism the present rotary friction construction 10 is utilized. The hub 12 is provided with an upstanding or radially disposed flange 16 against which are positioned a plurality of mounting members generally identified by the numeral 18 and more clearly shown in detail in FIG. 3.

The mounting members 18 may be of any convenient construction. In the present construction 10, they comprise a substantially planar plate-shaped element 20 that is tapered radially outward to a larger configuration than its radial inner portion. The plate surface 18 is stepped at 22 to form an offset extension plate-shaped ear 24. The offset of the ear 24 with respect to the plane of the plate 20 is equal substantially to the thickness of a next adjacent plate surface 20 of another mounting member 18, thereby providing an overlapping relationship between the ear 24 of one mounting member and a plate 20 of the next adjacent mounting member.

Each mounting member 18 is provided with a plurality of mounting means here shown in the form of holes 26 through which a bolt, rivet or other attachment means may be passed in order to enable the attachment and semipermanent or permanent securement of the mounting members 18 against the flange 16 of the hub. In the present embodiment a covering washer 28 is provided to retain the overlapping ears and mounting plates 24 and 20 of adjacent mounting members 18 against each other while rivets 30 are utilized to secure the whole together with the hub at the flange 16.

The platelike surfaces 20 are, therefore, in touching and cooperative attached engagement with each other at their radial inner portions and at their ears with the next adjacent plate like members and, thus, they form a complete circumferentially arranged clutching or braking structure. However, each platelike member 20 is separated from the other at a point extending radially outward and beyond their ears 24. Thus, in the configuration disclosed, each of the members 20 has an ever and progressively enlarging planar area as its surface extends away from its connection with the hub 12. These increasing areas of the plates 20 are utilized to provide mountings for friction members generally identified by the numeral 32.

Illustrated in the embodiment of FIGS. 1, 2, 3 and 4a of the drawing is a fraction member 32 which comprises a body portion 34 that is formed as a unitary and integral portion with a friction area 36. The body 34 and the friction area 36 are formed from the same friction material and they define an unitary construction wherein the friction area and the body portion are contiguous extensions of each other. The friction member 32 thus described is adapted to be mounted on the mounting plate 20 of a respective mounting member 18.

The mounting is accomplished in a simple rivetless, bond-free manner. The mounting plate 20 is provided with a hole 38, the shape and size of which will depend upon the area of the mounting plate 20 that is available for supporting the friction member 32. In the present drawing, the mounting hole 38 is shown to be circular in cross section for illustrative purposes only while the body portion of the friction member 32 will have the same shape and correspond substantially in size to the defines of the mounting hole 38 so as to fit closely therewithin and to enable the outer bordering surface of the body portion 34 to engage substantially fully and completely with the defines of the hole 38. The friction area 36 of the friction member 32 shown in FIGS. 1 to 4a extends axially beyond one of the planar surfaces of the mounting plate 20 and thus overlies the adjacent planar surface of the plate. This presents an enlarged friction area that is of greater size and extent than the body portion 34 thereof which serves to cooperatively engage with the defines of the hole 38 and which cooperative engagement forms a mount to retain the friction member 32 on the plate 20 and within the mounting hole 38 thereof.

The outer configuration of the friction area 36 may take any shape or form. It may be circular as shown for exemplary purposes in the drawing or it may be trapezoidal or of any other shape. In practice it has been found that the configuration of the extended friction area 36 may approximate that of the shape of the plate 20 shown in FIGS. 1 and 3 to thereby present as large a friction engaging surface as possible to any member that may be brought into engagement with the same, such as a relatively rotatable member shown in dot-dash lines in FIG. 4a and identified by the numeral 40. Because the extended friction area 36 of the friction member 32 projects axially beyond the planar surface of the plate 20 and is unrestricted and unencumbered by the presence of any surrounding supporting structural details, it will be recognized that the whole of this extension is available for frictional engagement and wear. The whole of this extension, being of a greater extent than its unitary body portion 34, overlies the adjacent planar surface of the mounting plate 20. However, it will be recognized that the overlying surface of the friction area 36, although in touching engagement with the adjacent surface of the plate 20, is free of any physical attachment means securing the same to such plate 20. Thus, the sole support for the friction member 32 mounting the same to the plate 20 is the cooperation between the body portion 34 and its cooperation with the defines of the hole 38.

Those skilled in the art will readily recognize that upon the application of frictional forces between the relatively rotatable member 40 and the facing friction surface of the member 32 as shown in FIG. 4a heat will be generated. Such heat is dissipated at the exposed surfaces of the friction area 36 and through the friction member 32 to the plate 20 at the surfaces of engagement of the body portion 34 with the surrounding defines of the hole 38. Inasmuch as each plate 20 is spaced and separated from the next adjacent plate by the outer radial defines of the rotary friction construction 10, greater heat dissipation is afforded through the larger exposed surfaces of the plate 20.

Unlike prior art structures, there can be no distortion in the nature of coning or buckling in the present construction. It has been found that because the friction member 32 is of a relatively softer and more wearable material than the plate 20, the engagement between the two at the body portion 34 and hole 38 permits for sufficient expansion of the body portion without deleteriously affecting the shape or configuration of the supporting hole 38. Moreover, whatever heat is generated and transmitted from the friction member 32 to the plate 20 is dissipated along the exposed surfaces of the friction member 32 and the heat transmitted by the body portion 34 to the mounting plate 20 is quickly dissipated at its exposed surfaces obviating distortion of the plate.

The embodiment illustrated in FIG. 4b is related to the embodiment shown in FIGS. 1 to 4a inclusive in that the friction member there shown is generally identified by the numeral 132 and similar parts and details are, therefore, numbered in the one hundred series (100 with the ten's (10's) digits being the same as corresponding ten's (10's) digits in the embodiment previously described.

The embodiment of FIG. 4b illustrates the utilization of the present invention wherein the same is adapted to be engaged between two relatively rotatable members 140 positioned on opposite sides of the mounting plate 120. In such case the friction member 132 is substantially H-shaped in cross section wherein the body portion 134 thereof is formed unitary with two axially extending friction areas 136 on opposite sides thereof. Thus, the body portion 134 positioned between the axially extending friction areas 136 spaces the two friction areas from each other by at least a width equal to the thickness of the mounting plate 120. This enables the two oppositely disposed friction ares 136 to overlie opposite respective adjacent planar surfaces of the mounting plate free of mechanical attachment therewith, yet positioned along such surfaces to assume any desired configuration.

It has been found that the formation of the friction member 32 of FIG. 4a and 132 of FIG. 4b may be formed from the same friction material. The friction members may be molded in situ about and within the hole 38 and 138 of the respective plates 20 and 120. During the molding process, care is taken to prevent bonding between the adjacent surfaces of the axially extending friction areas 36 and 136 and the respective faces of their mounting plates 20 and 120. Although some minimal bonding or adhesion may occur during the molding of the friction members in situ with respect to the mounting plates 20 and 120, the adhesion is of such nature as to break down upon the first use of the structures.

In the embodiment of FIG. 4a, the friction member 32 may be preshaped and molded separately and apart from the mounting plate 20. However, its body portion 34 will have substantially the same size and shape as the defines of the opening 38 to provide for a close fit engagement with the hole 38. When the member 32 is molded to the plate 20, the body portion will be molded directly within the hole 38 while the friction area 36 is molded to extend beyond at least the one side 36 of the adjacent plane of the rotation of the mounting plate 20. The extension of the area 36 will be in the direction of the axis of rotation of the plate and, thus, the extent of wear afforded by the extension 36 will be greater than presently known inventions wherein the extent of wear is limited by the presence of mechanical mounting means as attaching bolts, rivets and the like. The absence of bonding adhesives permits the extension 36 to expand and contract freely of the unequal expansion and contraction of the mounting plate 20 and, thus, the possibility of buckling and coning of any of the details is obviated.

In the formation of the friction member 132 of FIG. 4b, the body portion 134 first may be molded within the hole 138 of the plate 120. Thereafter, the two friction areas 136 may be formed to extend opposite to each other in the direction of the axis of rotation of the plate 120 and thereafter such extensions may be molded or formed to a size and shape larger than the mounting hole 138 in which the body portion 134 fits. The overlying relationship of the enlarged extensions and friction areas 136 and their freedom from physical or mechanical attachment as by bonding, rivets and the like to the plate 120 prevents the accidental axial displacement of the friction member 132 from the plate 120. Understandably, this also permits a longer life and use of the friction members that are unhampered by the presence of any restricting or protruding attaching or securing structures.

Referring to the embodiment in FIG. 4c, the friction member there shown is generally identified by the numeral 232. To distinguish the details of construction of FIG. 4c from those of the prior embodiments, each of the numerals will be identified in the two hundred series (200 with the ten's (10's) digits being the same as corresponding ten's (10's) digits employed to identify like details of structures in the prior embodiment of FIG. 4a.

The mounting plate 220 is provided with a holder means 242. The shape of the holder means conforms to a mounting hole 238 that may be provided in the mounting plate 220. Positioned on opposite sides of the mounting plate 220 are relatively rotatable friction members 240 that are adapted to engage with opposite faces of the friction member 232. The holder member 242 is adapted to fit snugly within the hole 238 and may be welded or brazed to the plate 220 to support the same within the hole. The holder 242, being of greater axial extent than the thickness of the plate 220, provides a larger seat to support and mount the friction member 232 to the plate 220.

The friction member 232 has a body portion 234 that is adapted to be positioned within the axial extent of the holder 242. Formed as contiguous and unitary extensions of the body portion 232 are oppositely disposed axially directed friction areas 236. The areas 236 may be of substantially the same size and shape as the separating body portion 234 or they may be enlarged. However, each of the friction areas 236 extends beyond the opposite sides of the mounting plate 220 for engagement with respective ones of the relatively rotatable members 240. Those skilled in the art will readily recognize that if only one such member 240 is provided, it will be necessary to axially extend only one of the sides of the friction member 232.

In the construction described the friction member 232 is of unitary detail and each extended friction area 236 projecting in the direction of the axis of rotation of the plate 220 presents the whole of its contiguous extension for engagement by and wear against the adjacent relatively rotatable member 240. The axial extent of the area 236 may be increased by constructing the holder member 242 from the same or different material having substantially the same wear characteristics as that of the friction member 232. Thus, as the face of the friction area 236 wears down into planar alignment with an adjacent face of the holder means 242, because the holder means is made from a material having similar wear characteristics, it, too, will constitute a wearing, clutching and/or braking surface thereby extending the life of use of the friction member 232.

As in the prior embodiments, it will be recognized that there are no rivets, bolts, bonds or other mechanical attachment means securing the friction member 232 to the mounting plate 220. Hence, heat generated during the application of clutching or braking forces is dissipated through the exposed surfaces of the friction member 232. When the member 232 is formed, it may be molded in situ within the holder 242 either before or after the holder is mounted on the plate 220. During the molding operation the body 234 is molded first and the extensions 236 are then formed in an axial direction therefrom. The shape of the body portion 234 is substantially that of the interior of the holder 242. However, the size thereof is such as to be in touching engagement with the holder so that during the dissipation of heat as a result of the application of kinetic energy, heat is also dissipated through the contacting or engaging surfaces of the body portion 234 with the holder 242 without producing a consequent distortion in the mounting plate 220. By permitting expansion of the less hard friction materials of the friction member 232 and holder 242, deleterious malformation and distortion of the plate 220 is obviated.

While there have been shown and described and pointed out the fundamental novel features of the invention as applied to preferred embodiments thereof, it will be understood that various omissions and substitutions and changes in the form and details of the devices illustrated and in their operation may be made by those skilled in the art, without departing from the spirit of the invention. It is the intention, therefore, to be limited only as indicated by the scope of the claims appended hereto.

What is claimed is:

1. In a rivetless, bond-free rotary friction structure,
a circular hub,
a plurality of substantially planar mounting plates each having an offset ear overlying and attached with a next adjacent mounting plate to said hub circumferentially thereabout and free of connecting means therebetween and from each other radially outward therefrom,
a hole of a desired size and shape defined in said mounting plate,
a friction member having a body portion of a size and shape corresponding substantially to that of the defines of the hole,
and a friction area on said body portion extending axially beyond the plane of the mounting plate,
said friction area presenting substantially the whole of its axial extent for frictional engagement and wear.

2. In a rivetless, bond-free rotary friction structure as in claim 1,
said body portion being unitarily formed with and from the same material as said friction area.

3. In a rivetless, bond-free rotary friction structure as in claim 1,
said friction area being of a greater extent in the direction of the plane of said mounting plate than said body portion and overlying an adjacent planar surface of said mounting plate.

4. In a rivetless, bond-free rotary friction structure as in claim 3,
said greater friction area and adjacent planar surface of said mounting plate being free of attachment means.

5. In a rivetless, bond-free rotary friction structure as in claim 3,
said friction member having at least one of said friction areas and said body portion being correspondingly sized and shaped to the interior defines of the hole to engage the same.

6. In a rivetless, bond-free rotary friction structure as in claim 3,
said friction member having two of said friction areas formed unitarily with each other and said body portion therebetween spacing said two friction areas from each other by at least the width of said mounting plate to enable said two friction areas to overlie opposite respective adjacent planar surfaces of said mounting plate free of attachment therewith along said surfaces.

7. In a rivetless, bond-free rotary friction structure as in claim 2,
said body portion and friction area being coextensive and of substantially the same size and shape,
and holder means mounted in and extending through the hole of said mounting plate and supporting said friction member with the friction area thereof projecting beyond a side of said mounting plate.

8. In a rivetless, bond-free rotary friction structure as in claim 7,
said friction member having at least two friction areas integral with and unitarily jointed together by said body portion intermediate said friction areas with said friction areas projecting beyond opposite sides of said holder means and said mounting plate.

9. In a rivetless, bond-free rotary friction structure having a hub rotatable about an axis,
a plurality of mounting members secured to and circumferentially positioned about said hub,
said mounting members each having a mounting plate with an offset ear overlying the next adjacent mounting plate and rotatable with said hub in a plane about the axis of rotation with the mounting plates each being circumferentially spaced from and free of connecting means therebetween and from the other along a portion spaced radially outward of said hub,
and a friction member for each of said mounting plates having a body portion and a friction area each unitary and forming a contiguous extension of the other,
a mounting opening defined in each of said mounting plates,
and said body portion corresponding in shape and substantially in size to that of the mounting opening to be received therein and to cooperatively engage with the defines of said mounting opening to form a rivetless, bond-free retention of said friction member to position said friction area axially beyond the plane of rotation of said mounting plate.

UNITED STATES PATENT OFFICE
CERTIFICATE OF CORRECTION

Patent No. 3,610,383        Dated October 5, 1971

Inventor(s) FRANK N. ROSTEO

It is certified that error appears in the above-identified patent and that said Letters Patent are hereby corrected as shown below:

<u>Inventor:</u> Change "Rosteo" to -- Roseto --

IN THE CLAIMS:

Claim 8, Line 4, change "jointed" to -- joined --

Signed and sealed this 28th day of March 1972.

(SEAL)
Attest:

EDWARD M. FLETCHER, JR.        ROBERT GOTTSCHALK
Attesting Officer        Commissioner of Patents